April 14, 1964   J. K. HARVEY ETAL   3,129,064
APPARATUS FOR DISPERSING FINELY-DIVIDED SOLIDS IN LIQUIDS
Filed Sept. 19, 1960
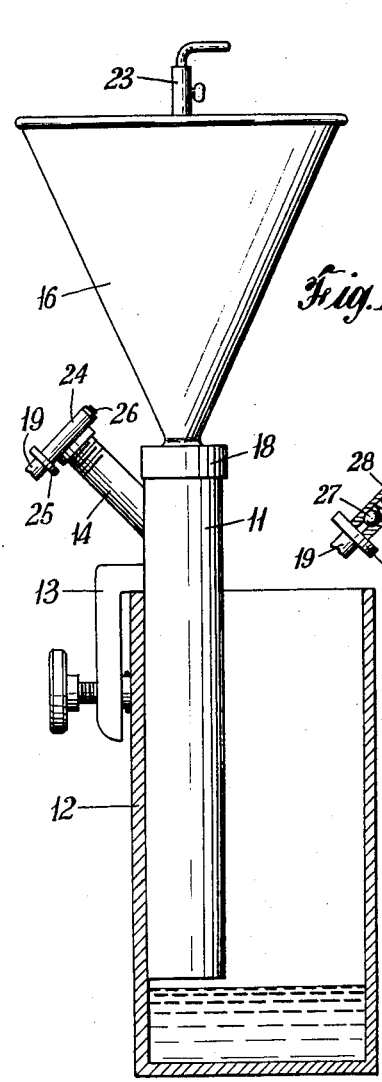
Fig. 1.
Fig. 2.
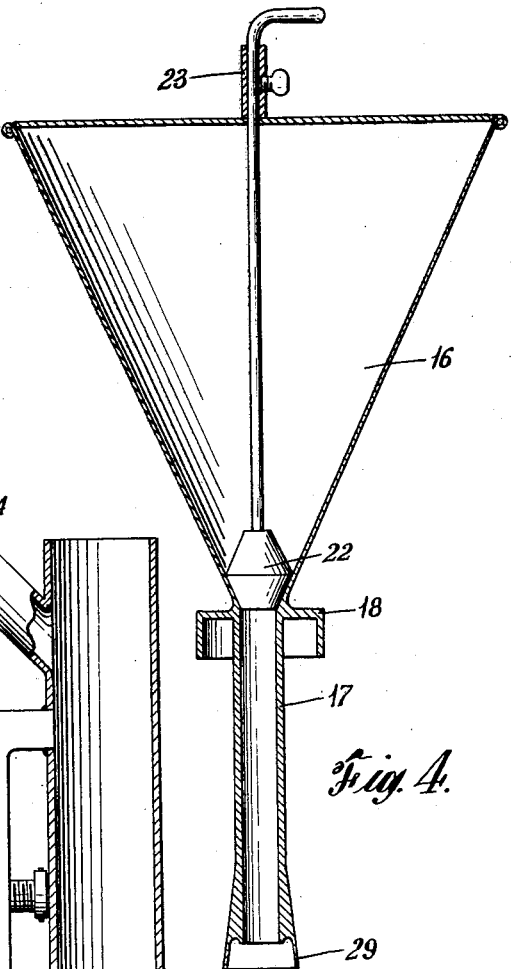
Fig. 3.
Fig. 4.
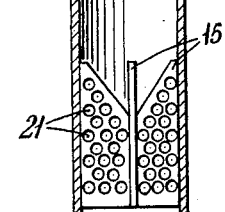
INVENTORS
PAUL E. BOLIEK
JOHN K. HARVEY
BY
ATTORNEY

United States Patent Office 3,129,064
Patented Apr. 14, 1964

3,129,064
APPARATUS FOR DISPERSING FINELY-DIVIDED SOLIDS IN LIQUIDS
John K. Harvey, Charleston, and Paul E. Boliek, St. Albans, W. Va., assignors to Union Carbide Corporation, a corporation of New York
Filed Sept. 19, 1960, Ser. No. 56,969
5 Claims. (Cl. 23—267)

The invention relates to an apparatus for dispersing finely-divided solids in liquids. In a particular aspect, the invention relates to an apparatus for dispersing finely-divided, water-soluble polymers in water. In a more particular aspect, the invention relates to an apparatus for dispersing granular poly(ethylene oxide) in water.

Water-soluble poly(ethylene oxide) resins of high molecular weight are well known materials that are produced by the catalytic polymerization of ethylene oxide. As commercially produced, these resins are free-flowing granular solids having an average particle size in the range of 10–100 mesh. One of the outstanding properties of these resins is their high thickening efficiency in dilute solutions. In order to utilize the thickening properties of the poly(ethylene oxide), the solid resin must be dissolved. However, solubilizing is difficult since the wetted particles of resin tend to agglomerate and form sticky lumps that have a slow rate of solution. It is thus important to disperse the resin in a manner which avoids lumping or agglomeration in order that the solids surface to liquid volume ratio is not reduced, which in turn lowers the ratio of mass rate of solution to total mass.

Known methods of dispersion and dissolving heretofore employed include vigorous agitation for periods of time ranging from about two to 36 hours or more, blending with Venturi nozzles, and dry coating agents such as sodium bicarbonate, sucrose, and the like. Rapid plugging and fouling of Venturi nozzles and other similar mechanical dispersers is a serious operating problem. A further problem encountered when dispersing is accomplished by agitation is the shear degradation of the resin, as evidenced by loss of solution viscosity. This problem is particularly troublesome when preparing high viscosity solutions, that is, solutions having viscosities of about 6000 centipoises and higher. If the resin particles are not uniformly dispersed in the water, with few or no lumps or agglomerates of resin, high solution viscosities will not be attainable because the agitation required to break up and dissolve the lumps will also cause shear degradation of the resin.

The present invention provides an apparatus for dispersing finely-divided solids in liquids that is particularly useful for preparing uniform, lump-free dispersions of poly(ethylene oxide) in water, and thus is useful for facilitating the solubilization of poly(ethylene oxide) in water.

The apparatus of the invention consists of an open-ended, downwardly-extending, cylindrical mixer tube, conduit means attached to and in communication with said mixer tube for introducing liquid downwardly and tangentially inside said mixer tube, and thus causing said liquid to spiral down the inside surface of said mixer tube, vortex-closing means located inside said mixer tube below the conduit means, and solids feeding means for introducing finely-divided solids inside said mixer tube at a location between the conduit means and the vortex-closing means.

FIGURE 1 is an elevational view of an apparatus embodying the principles of the invention, shown mounted on a container.

FIGURE 2 is a plan view of the mixer tube.

FIGURE 3 is a partial cross-sectional elevation of the mixer tube.

FIGURE 4 is a cross-sectional elevation of a hopper assembly employed as the solids-feeding means.

Referring now to FIGURES 1, 2, 3, and 4, wherein like numerals refer to like parts, an apparatus embodying the principles of the invention is illustrated. In FIGURE 1, an apparatus for dispersing finely-divided solids in liquids is shown mounted on a container. The apparatus comprises a cylindrical mixer tube 11 that is open at both ends. The mixer tube 11 is mounted on a container 12 by any suitable means, such as a clamp 13. The conduit means for introducing liquid downwardly and tangentially into the mixer tube 11 is shown in FIGURES 1, 2, and 3 as a tube 14 which is attached to the mixer tube 11 both downwardly, as is shown in FIGURES 1 and 3, and tangentially as is shown in FIGURE 2. Thus, liquid which enters the mixer tube 11 from tube 14 will spiral down the inside surface of the mixer tube 11 in a vortex-like motion. The vortex-closing means are shown in FIGURES 2 and 3 as baffles 15 which are located at the bottom of the mixer tube 11.

The solids-feeding means are depicted in FIGURES 1 and 4 as a hopper assembly which consists of a hopper 16, a feeder tube 17 extending downwardly from the hopper 16, and a supporting cap 18. The hopper assembly is mounted on the upper end of the mixer tube 11 by first inserting the feeder tube 17 down into the mixer tube 11 and then slipping the supporting cap 18 over the upper end of the mixer tube 11, where it fits snugly. The feeder tube 17 extends down into the mixer tube 11 to a location between the point of attachment of tube 14 and the baffles 15.

In carrying out the operation of the apparatus, a source of pressurized liquid (not shown) is attached to the inlet orifice 19 of tube 14. The liquid can be under a pressure of from as low as about 1 p.s.i.g. up to about 100 p.s.i.g. After entering tube 14, the liquid flows into the mixer tube 11 and spirals down the inner surface of the mixer tube 11, until the flowing liquid strikes the baffles 15. The baffles 15 interfere with the liquid flow and cause the liquid vortex to completely cover the cross-section of the mixer tube 11. The baffles 15 can be tapered, as shown in FIGURE 3, to conform to the shape of the closing vortex, thereby enabling the entire surface area of the baffles 15 to be wetted by the flowing liquid, which prevents build-up of solids. The baffles 15 can also have a plurality of holes 21 drilled through them, as shown in FIGURE 3. The holes 21 enable the liquid to flow more freely from one baffle to the next, and thereby effect more thorough liquid coverage of the cross-section of the mixer tube 11.

The finely-divided solids flow from hopper 16 through feeder tube 17 into the mixer tube 11, and then fall into the liquid vortex, where the solids are uniformly dispersed in the liquid. The rate of solids flow is regulated by raising or lowering valve 22 by means of clamp 23. The ratio of solids flow to liquid flow is not critical, and can vary from about 1 part by weight of solids to 1000 parts by weight of liquid, to as high as about 30 parts by weight of solids to 100 parts by weight of liquid. The apparatus is operative with finely-divided solids having average particle sizes falling in the 10 to 200 mesh range.

An important feature of the invention is that the finely-divided solids are introduced into the mixer tube 11 at a location between the point at which tube 14 is attached to the mixer tube 11 and the baffles 15. By so doing, the dry solids are prevented from contacting the wet-dry interface where the liquid enters the mixer tube 11, where solids build-up could be a problem. It is desirable to have a protective skirt 29 at the end of the feeder tube 17 to protect the point of entry of dry solids from splashing by the liquid flowing down and around the inner wall of the mixer tube 11, and also from the drops of liquid which splash onto the feeder tube 17, run down, and drip off the bottom, both of which could cause a problem of solids build-up.

The dispersion of the finely-divided solids in the liquid takes place when the solids falls into the rapidly moving liquid surface of the closed vortex that is formed by the vortex-closing means. The individual resin particles are uniformly dispersed in the liquid before they are completely wetted, thus virtually eliminating the possibility of formation of lumps or agglomerates. The vortex-closing means need not be in the form of baffles, but can be any suitable insert that will cause the downwardly spiralling liquid to close in a vortex that completely covers the cross-section of the mixer tube, thus preventing a mean free path for fall-through of dry solids.

If desired, the apparatus of the invention can be equipped with vibrating means for promoting even flow of solids into the mixer tube, although the apparatus is fully operative without said vibrating means. Any type of vibrating means can be employed, from an electrically-operated vibrator to a knock on the solids hopper with a wrench. One type of vibrating means which can be employed is a liquid-actuated vibrating means which uses as a source of power the liquid entering the conduit means, and consists of a spherical ball seated against the inside of a circular orifice by a spring, so that liquid entering said orifice will unseat the ball, the spring will reseat the ball, the vibration resulting from the rapid unseating and reseating of the ball. After actuating the vibrating means, the liquid then enters the conduit means.

One embodiment of a liquid-actuated vibrating means is illustrated in FIGURES 1, 2, and 3, and consists of a T 24 which is attached to the liquid inlet end of tube 14, a reducer 25 attached to one arm of the T 24 and a plug 26 attached to the other. A steel ball 27 is seated against the inside opening of the reducer 25 by a spring 28, which in turn is backed up by the plug 26.

The apparatus can be employed to disperse virtually any finely-divided solid in any liquid, but is especially useful for dispersing water-soluble polymers in water, and thereby facilitating the dissolution of said water-soluble polymers in water. In addition to poly(ethylene oxide), other water-soluble polymers which can be dispersed in water by the apparatus of the invention include, for example, hydroxyethyl cellulose, poly(vinyl alcohol), starch, various coagulants, and the like.

The invention is illustrated by the following non-limiting examples:

*Example 1*

An apparatus was constructed according to the invention which had the following dimensions:

Mixer tube—A cylindrical tube, open at both ends, 16 inches long, 2⅜ inches in diameter (OD), made of schedule 40 aluminum pipe;

Conduit means—A cylindrical tube 1 inch in diameter, attached to the mixer tube tangentially, as shown in FIGURE 2 in the drawings, and downwardly at an angle of 45° from the horizontal. The conduit means was affixed to the mixer tube 4¾ inches below the top of said mixer tube (distance measured to the center of the conduit means);

Vortex-closing means (baffles)—Mounted in the bottom of the mixer tube, as shown in FIGURE 3, the baffles were 3 inches high at the outer edge and tapered to a height of 1¾ inches in the middle. There were 19 holes of ¼-inch diameter in each quarter section of the baffles.

Hopper—10 inches high, with a diameter of 10 inches at the top tapering to a diameter 1¼ inches at the bottom.

Feeder tube—Attached to the bottom of the hopper was 7½ inches long and 1 inch in diameter.

Protective skirt—Attached to the bottom of the feeder tube, 2 inches high and tapered outward to a diameter of 1⅜ inches at the bottom. The bottom edge of the protective skirt extended ½-inch below the bottom of the feeder tube.

The apparatus was attached to the side of a 55-gallon open-top drum. 300 pounds of a 1 percent solution of poly(ethylene oxide) in water was made according to the following procedure:

Three pounds of powdered poly(ethylene oxide) were charged to the hopper with the feed regulating valve in the closed position. A source of pressurized water was attached to the conduit means, and then turned on. The water was at a temperature of about 30° C., and under a pressure of about 60 p.s.i.g. at the source. After the water had been turned on, the poly(ethylene oxide) was admitted to the mixer tube by opening the feed regulating valve. The solids flow was adjusted so that all of the solids were processed shortly before the required amount (297 pounds) of water had entered the 55-gallon drum. The total time which the dispersion step took was about 3 minutes.

After the polymer had been dispersed, the contents of the drum were gently agitated for 20 minutes by air sparging to give a lump-free, homogeneous solution. The viscosity (6000 centipoises) indicated that little or no shear degradation had occurred.

Examination of the apparatus showed that no solids build-up had taken place.

*Example 2*

The same apparatus and general procedure were employed as in Example 1, except that 3000 pounds of solution were prepared. Examination of the apparatus showed that no solids build-up had taken place, even with the much larger quantity of material processed.

The apparatus employed in the examples was constructed of aluminum, however, any of the common materials of construction, such as steel, glass, plastic, copper, and the like, can be used.

What is claimed is:

1. An apparatus for dispersing solids in a liquid medium which comprises an open-ended, cylindrical mixer tube, conduit means communicating with said mixer tube for introducing a flow of liquid downwardly and tangentially into said mixer tube thereby forming a spiralling liquid flow down the inside surface of said mixer tube, solids feeding means for introducing a stream of finely-divided solids into said mixer tube below said conduit means, and a pair of intersecting baffles having a plurality of holes through said baffles, said pair of intersecting baffles being located below said solids feeding means.

2. An apparatus for dispersing solids in a liquid medium which comprises an open-ended, cylindrical mixer tube, conduit means communicating with said mixer tube for introducing a flow of liquid downwardly and tangentially into said mixer tube thereby forming a spiralling liquid flow down the inside surface of said mixer tube, solids feeding means for introducing a stream of finely-divided solids into said mixer tube below said conduit means, said solids feeding means and the inner cylindrical surface of said mixer tube having an open space between them which has an annular cross-section, and flow interfering means below said solids feeding means for causing the liquid flow to cover the cross-section of the mixer tube.

3. An apparatus for dispersing solids in a liquid medium which comprises an open-ended, cylindrical mixer tube, conduit means communicating with said mixer tube for introducing a flow of liquid downwardly and tangentially into said mixer tube thereby forming a spiralling liquid flow down the inside surface of said mixer tube, solids feeding means for introducing a stream of finely-divided solids into said mixer tube below said conduit means, said solids feeding means and the inner cylindrical surface of said mixer tube having an open space between them which has an annular cross-section, and a pair of intersecting baffles having a plurality of holes through said baffles, said pair of intersecting baffles being located below said solids feeding means.

4. An apparatus for dispersing solids in a liquid medium which comprises an open-ended, downwardly extending, cylindrical mixer tube, conduit means communicating with said mixer tube for introducing a flow of liquid downwardly and tangentially into said mixer tube thereby forming a spiralling liquid flow down the inside surface of said mixer tube, solids feeding means at the upper end of said mixer tube and extending down into said mixer tube below said conduit means for introducing a stream of finely-divided solids into said mixer tube below said conduit means, said solids feeding means and the inner cylindrical surface of said mixer tube having an open space between them which has an annular cross-section, and a pair of intersecting baffles at the lower end of said mixer tube, said baffles having a plurality of holes therethrough.

5. The apparatus of claim 4 wherein a liquid actuated vibrating means is attached to the liquid receiving end of said conduit means, said liquid actuated vibrating means comprising a circular liquid inlet orifice, a spherical ball seated against the inside of said circular liquid inlet orifice, and an outlet orifice through which liquid discharges into said conduit means.

References Cited in the file of this patent

UNITED STATES PATENTS

| | | |
|---|---|---|
| 130,927 | Lovie | Aug. 27, 1872 |
| 1,565,249 | Berry | Dec. 15, 1925 |
| 1,934,716 | Jewett | Nov. 14, 1933 |
| 2,460,884 | Hjort et al. | Feb. 8, 1949 |